United States Patent [19]

Konishi

[11] Patent Number: 5,168,790
[45] Date of Patent: Dec. 8, 1992

[54] LIQUID PRESSURE BOOSTER

[75] Inventor: Masaru Konishi, Saitama, Japan

[73] Assignee: Jidosha Kiki Co., Ltd., Tokyo, Japan

[21] Appl. No.: 782,414

[22] Filed: Oct. 25, 1991

Related U.S. Application Data

[63] Continuation of Ser. No. 516,093, Apr. 27, 1990, Pat. No. 5,076,141.

[30] Foreign Application Priority Data

May 12, 1989 [JP] Japan ............................ 1-119653
Jun. 23, 1989 [JP] Japan ............................ 1-162385

[51] Int. Cl.[5] ............................................ F15B 9/10
[52] U.S. Cl. .................................. 91/368; 91/369.1; 91/376 R; 91/374; 60/547.1
[58] Field of Search .................. 91/368, 369.1, 376 R, 91/374, 370, 372, 373, 6, 31, 32; 60/547.1; 180/282, 272; 303/100; 192/1.24, 1.32, 1.35

[56] References Cited

U.S. PATENT DOCUMENTS

| | | | |
|---|---|---|---|
| 3,106,874 | 10/1963 | Schultz | 60/547.1 X |
| 3,165,980 | 1/1965 | Peras | 91/370 |
| 3,707,880 | 1/1973 | Bach | 91/376 X |
| 3,747,473 | 7/1973 | Bach et al. | 91/373 |
| 4,075,848 | 2/1978 | Veda | 91/31 X |
| 4,656,923 | 4/1987 | Tsuyuki et al. | 91/369.1 |
| 4,706,546 | 11/1987 | Inoue et al. | 91/370 |
| 4,905,571 | 3/1990 | DeHoff et al. | 91/376 R X |

Primary Examiner—Edward K. Look
Assistant Examiner—Todd Mattingly
Attorney, Agent, or Firm—Flynn, Thiel, Boutell & Tanis

[57] ABSTRACT

A liquid pressure booster includes a power piston slidably disposed in a housing, a power chamber in the housing on one side of the power piston, the power piston having a stepped bore including smaller and larger diameter bores, the latter opening into the power chamber, a supply passage communicating the smaller diameter bore to a pressure fluid source, a first valve seat in the smaller diameter bore, a valve element slidable in the smaller diameter bore to seat upon the first valve seat from the side nearer the pressure fluid source, an annular pin abutting the valve element side nearer the larger diameter bore to move the valve element away from the first valve seat, a discharge passage axially through the annular pin and communicating between the power chamber and a reservoir, and a second valve seat formed on the free end of the annular pin to interrupt communication between the power chamber and the discharge passage upon abutment of the annular pin against the valve element, a stepped sleeve having smaller and larger diameter portions which are fitted into the smaller and larger diameter power piston bores, a stopper ring and a further sleeve fitted successively in the larger diameter power piston bore, the stopper ring and sleeve successively contacting the stepped sleeve larger diameter portion, the further sleeve being secured to the power piston to secure the stepped sleeve and the stopper ring to the power piston.

6 Claims, 1 Drawing Sheet

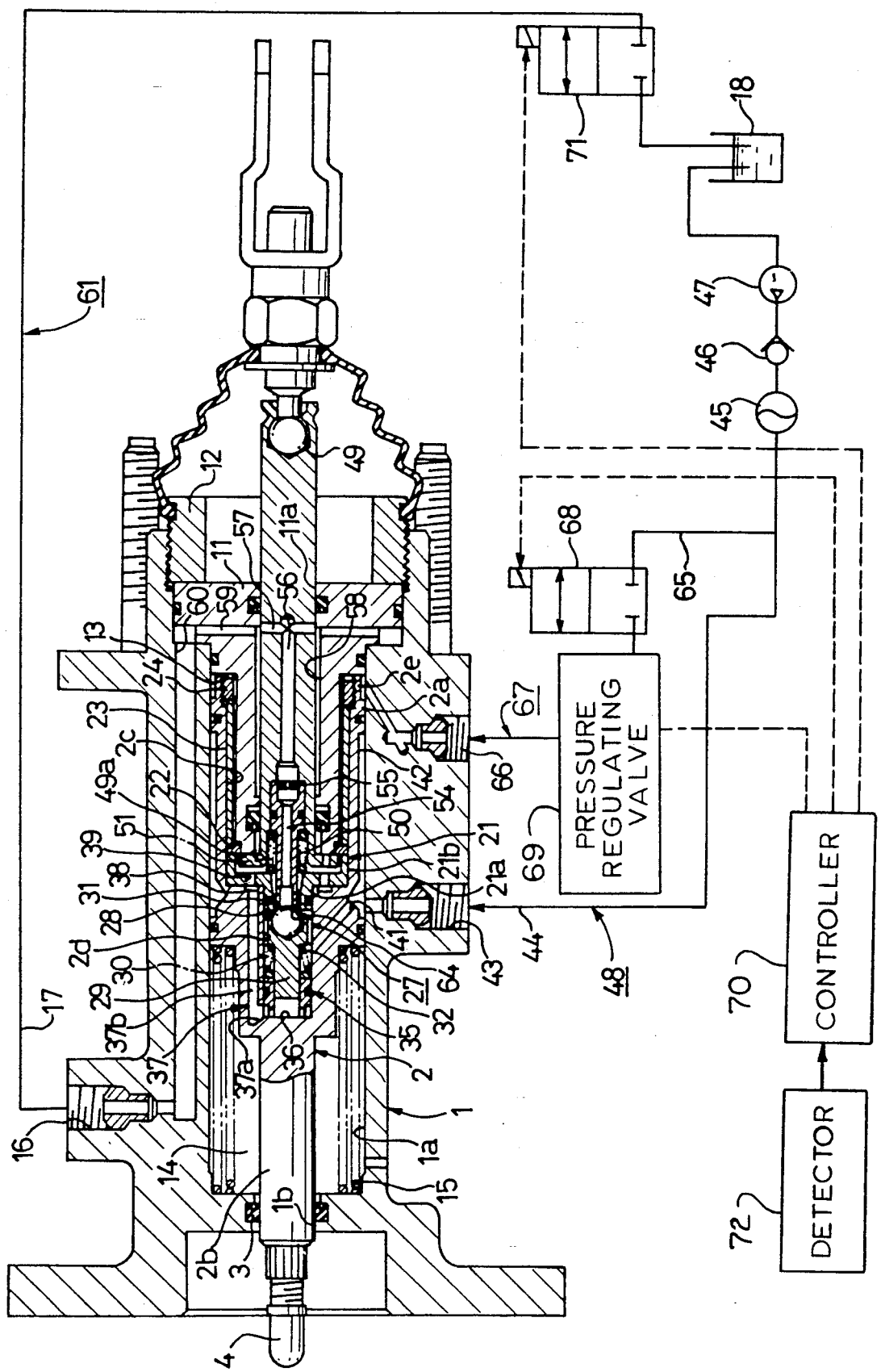

LIQUID PRESSURE BOOSTER

This is a continuation of Ser. No. 07/516,093, filed Apr. 27, 1990, now U.S. Pat. No. 5,076,141.

FIELD OF THE INVENTION

The invention relates to a liquid pressure booster which may be used in a brake booster or the like.

DESCRIPTION OF THE PRIOR ART

A conventional liquid pressure booster which may be used in a brake booster, for example, generally comprises a power piston which is slidably disposed in a housing, a power chamber defined within the housing on one side of the power piston, a stepped bore formed in the power piston and including bore portions of a smaller and a larger diameter with the bore of a larger diameter opening into the power chamber, a supply passage for communicating the interior of the bore of a smaller diameter communicating with a source of pressure fluid, a first valve seat formed in the bore of a smaller diameter, a valve element slidably disposed within the bore of a smaller diameter and adapted to be seated upon the first valve seat from the side nearer the source of pressure fluid, an annular pin operated in interlocked relationship with an input shaft for abutment against the valve element from the side nearer the bore of a larger diameter to move it away from the first valve seat to thereby introduce a pressure fluid from the source into the power chamber, a discharge passage formed in a shank portion of the annular pin for communicating the power chamber with a reservoir, and a second valve seat formed on the free end of the annular pin for interrupting a communication between the power chamber and the discharge passage upon abutment of the annular pin against the valve element.

Generally, the end of the valve element opposite from that end which is adapted to be seated upon the first valve seat extends through second seal means into a balance chamber, and a pressure chamber is defined between the second seal means and the first valve seat and communicates with the supply passage. The balance chamber communicates with the power chamber through a communication opening which is formed in the power piston.

In the liquid pressure booster mentioned above, when a brake pedal is released, the annular pin is spaced from the valve element to thereby allow the power chamber to communicate with the reservoir through the discharge passage, and the valve element is seated upon the first valve seat to close the pressure chamber to which the pressure fluid is supplied.

By contrast, when the brake pedal is depressed and the annular pin causes the valve element to be moved away from the first valve seat, the second valve seat which is formed on the free end of the annular pin becomes seated upon the valve element, whereby the communication between the power chamber and the reservoir is interrupted. As the valve element moves away from the first valve seat, the pressure fluid is allowed to be admitted into the power chamber, whereby the power piston can be advanced under a fluid pressure.

At this time, the fluid pressure which is introduced into the power chamber can be fed to the balance chamber through the communication opening, whereby forces acting upon the valve element can be balanced despite pressure fluctuations if a pressure responsive area of the valve element on the side nearer the power chamber is chosen to be equal to a pressure responsive area thereof on the side nearer the balance chamber.

In the conventional liquid pressure booster, there is no advancing of the power piston under normal condition where the brake pedal is released. In other words, there has been no idea of operating the liquid pressure booster when the brake pedal is released.

In the conventional liquid pressure booster, the first valve seat formed within the bore of a smaller diameter is defined by providing an annular member which is a press fit in this bore. However, since this bore is located inside the bore of a larger diameter and since it is required that the axial size of the annular member be reduced in order to reduce the axial size of the liquid pressure booster, it is troublesome to dispose the annular member as a press fit into the bore of a smaller diameter formed in the power piston. In addition, there is a likelihood that the pressure liquid may leak between the outer surface of the annular member and the inner surface of the bore of a smaller diameter.

In addition, when forming the communication opening which provides a communication between the balance chamber and the power chamber in the power piston, it is necessary that a radial passage extending from the balance chamber radially outward of the power piston and an axial passage communicating with this radial passage be provided to define the communication opening.

When the radial passage is to be formed by a drilling operation, such radial passage must be drilled through the outer peripheral surface of the power piston with consequence that the resulting opening must be sealed by a plug member such as a ball. This results in a complicated construction and also involves the likelihood that the plug member may be disengaged.

On the other hand, another arrangement is proposed in which a recess which corresponds to the radial passage is formed in the end face of a push rod at its one end while the axial passage mentioned above is arranged to open into the free end of the power piston, with such opening being covered by the above mentioned end face of the push rod, thus allowing the axial passage to communicate with the recess. However, this arrangement is again complicated in construction and is therefore expensive to provide.

SUMMARY OF THE INVENTION

In view of the foregoing, the invention relates to a liquid pressure booster which is known in itself. Specifically, such booster comprises a power piston slidably disposed in a housing, a power chamber defined within a housing on one side of the power piston, a valve mechanism disposed in the power piston for switching a fluid path in response to the operation of an input shaft, a first supply passage providing a communication between the power chamber and a source of pressure fluid through the valve mechanism, and a discharge passage for providing a communication between the power chamber and a reservoir through the valve mechanism. In accordance with the invention, there are also provided a second supply passage which allows the power chamber to communciate with the source of pressure fluid without passing through the valve mechanism, a first and a second open/close valve which open or close the second supply passage and the discharge passage, respectively, and a controller for controlling the operation of the first and the second valve.

With this construction, the controller operates to close the first valve while maintaining the second valve open under a normal condition, thus allowing a pressure fluid to be supplied into the power chamber without passing through the second supply passage. Since the discharge passage remains open, there occurs the same operation as that occurring in a conventional liquid pressure booster.

By contrast, when the controller operates to open the first valve and to close the second valve, the pressure fluid can be introduced into the power chamber through the second supply passage, and the pressure fluid which has been introduced into the power chamber cannot be discharged to the reservoir through the discharge passage, so that the power piston may be advanced without driving the input shaft forward by the depression of a brake pedal or the like. In this manner, the liquid pressure booster may be utilized as an actuator for an automatic braking unit.

A liquid pressure booster including the valve mechanism mentioned above may also be modified in accordance with another aspect of the invention by providing a stepped sleeve including portions of a smaller and a larger diameter which are fitted into the bores of a smaller and a larger diameter formed in the power piston, respectively. Securing means fixedly connects the larger diameter portion of the stepped sleeve to the power piston while the first valve seat is formed on the free end of the smaller diameter portion of the stepped sleeve to allow the valve element to be seated thereupon. First seal means is disposed to maintain a liquid tightness between the smaller diameter portion of the sleeve and the bore of a smaller diameter.

When the stepped sleeve is fitted into the stepped bore formed in the power piston and the larger diameter portion of the sleeve is fixedly connected to the power piston by securing means such as a lock nut or by caulking, it will be seen that since the larger diameter portion is located outward of the smaller diameter portion, the assembling operation can be facilitated as compared with providing the annular member which is to be placed as a press fit into the bore of a smaller diameter as occurring in the prior art. In addition, the provision of the first seal means which seals a clearance between the smaller diameter portion of the sleeve and the bore of a smaller diameter reliably prevents a leakage of pressure fluid.

According to a further aspect of the invention, the supply passage comprises an opening formed to extend through the outer peripheral surface of the power piston and extending into the bore of a smaller diameter along an oblique path. The communicatin opening which provides a communication between the balance chamber and the power chamber comprises a first communication opening formed on an extension of the oblique opening formed in the power piston, and a second communication opening formed axially of the power piston. In addition, second seal means is disposed between the oblique opening and the first communication opening to interrupt a communication therebetween.

With this construction, the first communication opening, which corresponds to the radial passage used in the prior art, is formed on an extension of the oblique opening which defines the supply passage, and accordingly the first communication opening does not open into the outer peripheral surface of the power piston as occurring when the first communication opening is formed in the opposite direction from the outer peripheral surface of the power piston. In this manner, a plug member which is required to seal the resulting opening can be dispensed with, simplifying the construction and avoiding the likelihood of disengagement of such plug member.

Above and other objects and features of the invention will become apparent from the following description of an embodiment thereof with reference to the attached drawing.

BRIEF DESCRIPTION OF THE DRAWING

A single drawing is a perspective view, partly in longitudinal section, of one embodiment of the invention.

DETAILED DESCRIPTION OF EMBODIMENT

Referring to the drawing, an embodiment of the invention will now be described. A liquid pressure booster includes a housing 1 in which a bore 1a of a larger diameter is formed along its axis. A power piston 2 has a right portion 2a of a larger diameter which is slidably fitted in the bore 1a. The power piston 2 also includes a left portion 2b of a smaller diameter which slidably extends through an 1b formed in the left end wall of the housing, with a seal member 3 maintaining a dust tightness thereat. The free end of the left portion 2b is integrally formed with an output shaft 4 which is connected to a piston of a master cylinder, not shown.

At its right end, the opening of the bore 1a is closed by a plug 11, which is secured to the housing 1 by an annular nut 12. A power chamber 13 is defined between the plug 11 and the power piston 2 for admitting a pressure oil therein. A low pressure chamber 14 is defined on the opposite side of the power piston 2 from the power chamber 13, and a spring 15 is disposed therein for normally maintaining the power piston 2 in its inoperative position where it abuts against the plug 11. The chamber 14 communicates with an atmosphere. A passage 16 which is formed in the housing 1 communicates with a reservoir 18 through a conduit 17.

The right end of the power piston 2 is axially formed with a stepped bore having a closed bottom, the stepped bore including a bore 2c of a larger diameter which opens into the power chamber 13. The power piston 2 also includes a bore 2d of a smaller diameter, and a stepped sleeve 21 has portions 21a and 21b of a smaller and a larger diameter, respectively, which are fitted into the bores 2d, 2c, respectively, formed in the power piston. A stop ring 22 and a sleeve 23 are sequentially fitted into a portion of the bore 2c which is located to the right of the piston portion 21b of a larger diameter. At its right end, the bore 2c is formed with female threads, which are engaged by a lock nut 24 to secure the sleeve 23 in place. The lock nut 24 is secured to the power piston 2 by a punch caulking, not shown.

A first valve seat 28, which forms a valve mechanism 27, is formed on the free end of the portion 21a of a smaller diameter of the sleeve 21, and a valve element 29 disposed to the left of the valve seat 28 is urged by a spring 30 to be seated upon the valve seat. Seal means 31 such as 0-ring which is disposed in the outer peripheral surface of the portion 21a seals between the outer surface of the portion 21a and the inner surface of the bore 2d, thereby allowing a communication between the power chamber 13 and a pressure chamber 32, which are disposed to the right and to the left of the first valve seat 28, respectively, to be completely interrupted when the valve element 29 is seated upon the first valve seat 28.

As described, in the present embodiment, the stepped sleeve 21, the stop ring 22 and the sleeve 23 are sequentially fitted into the stepped bore formed in the power piston 2, and the outermost member in the stepped bore, namely, the sleeve 23 is secured in place by means of the lock nut 24 and the punch caulking in order to provide the first valve seat 28 within the bore 2d of a smaller diameter. Accordingly, as compared with an arrangement in which an annular member is disposed in the bore 2d as a press fit therein to provide a corresponding first valve seat 28, the assembling operation can be facilitated. In addition, the seal means 31 which seals the clearance between the small diameter portion 21a of the stepped sleeve 21 and the bore 2d improves in reliably preventing a leakage of pressure fluid as compared with the annular member which is disposed as a press fit.

Second seal means 35 is disposed within the bore 2d to the left of the first valve seat 28, defining the pressure chamber 32 between the second seal means 35 and the first valve seat 28. A balance chamber 36 is defined to the left of the second seal means 35, and communicates with the power chamber 13 through a communication opening 37 and an annular groove 38 formed in the power piston 2 and a hole 39 formed in the stepped sleeve 21.

The left end of the valve element 29 slidably extends through the second seal means 35, which functions to maintain a liquid tightness, into the balance chamber 36. By choosing a pressure responsive area of the valve element 29 as measured on the side nearer the balance chamber 36 to be substantially equal to a pressure responsive area of the valve element 29 as measured on the side nearer the power chamber 13, any fluctuation in the pressure within the power chamber 13 and the balance chamber 36 can be prevented from causing a displacement of the valve element 29.

The pressure chamber 32 communicates with an accumulator 45 through a passage 41 formed in the power piston 2, an annular groove 42 formed around the outer peripheral surface of the power piston 2, a radial passage 43 formed in the housing 1 and a conduit 44 connected to the passage 43. The accumulator 45 communicates with a pump 47 through a check valve 46. Accordingly, in the present embodiment, a first supply passage 48 which provides a communication between the pump 47, serving as a source of pressure fluid, and the power chamber 13 through the valve mechanism 27 comprises the conduit 44, the passage 43, the annular groove 42, the passage 41 and the pressure chamber 32.

The passage 41 is formed as an opening which extends from the outer peripheral surface of the power piston 2 into the bore 2d along an oblique path, and the communication opening 37 which provides a communication between the balance chamber 36 and the power chamber 13 is formed by a first communication opening 37a formed on an extension of the passage 41 and a second communication opening 37b which extends axially of the power piston 2. The second seal means 35 is disposed between the passage 41 and the first communication opening 37a to interrupt a communication therebetween or a communication between the pressure chamber 32 and the balance chamber 36. When the first communication opening 37a is formed on an extension of the passage 41, it is unnecessary that the first communication opening 37a opens into the outer peripheral surface of the power piston 2 as would be required if the first communication opening 37a is formed by drilling through the outer peripheral surface of the power piston 2 in the reverse direction, and accordingly there is no need to provide a plug member which closes the resulting opening. In this manner, the construction is simplified and the likelihood that the plug member may be disengaged is avoided.

An opening 11a is formed in the plug 11 in axial alignment with the bore 1a formed in the housing 1, and an input shaft 49 which is mechanically coupled to a brake pedal, not shown, is slidably fitted in the opening 11a. At its free end, the input shaft 49 is formed with a radially outwardly extending flange 49a, with an annular pin 50, forming part of the valve mechanism 27, attached to the axial portion of the flange 49a. The flange 49a of the input shaft 49 is positioned within the portion 21b of a larger diameter of the stepped sleeve 21, and is prevented from being disengaged from within the bore 2c formed in the power piston 2 to the right, by the stop ring 22 which is disposed to the right thereof.

Since the stop ring 22 is held sandwiched between the stepped sleeve 21 and the sleeve 23, the stop ring 22 can be positioned and held in place in a more reliable manner than when the stop ring 22 comprises a snap ring which is positioned by engaging with an annular groove formed in the inner peripheral surface of the power piston 2, as found in the prior art. However, it is also possible that the stepped sleeve 21 and the sleeve 23 be formed integrally, with the stop ring 22 mounted in an annular groove which is formed in the inner peripheral surface of the sleeve 23.

In the inoperative condition shown in which a brake pedal, not shown, is released, a spring 51 disposed between the input shaft 49 and the stepped sleeve 21 urges the input shaft to the right, whereby the flange 49a is maintained in its inoperative position shown where it abuts against the inner end face of the plug 11.

Under this condition, the annular pin 50 is spaced from the valve element 29, and a passage 54 which is formed to extend through the axial portion of the annular pin 50 communicates with the power chamber 13, and also communicates with the reservoir 18 through a noise suppressing orifice 55 which is formed internally therein, an axial passage 56 and a radial passage 57 which are formed in the axial portion of the input shaft 49, an annular groove 58 formed in the inner peripheral surface of the opening 11a formed in the plug 11, a radial passage 59 formed in the plug 11, an axial passage 60 formed in the housing 1 and the passage 16 and the conduit 17 both mentioned above, whereby the power chamber 13 is maintained in communication with the reservoir 18. Accordingly, in the present embodiment, a discharge passage 61 which communicates the power chamber 13 with the reservoir 18 comprises a variety of passages which are located between the passage 54 formed in the annular pin 50 and the conduit 17.

What has been described above relates to the inoperative condition. However, when a brake pedal is depressed to drive the input shaft 49 forward, the valve element 29 will be seated upon a second valve seat 64 which is formed on the free end of the annular pin 50 to interrupt the communication between the passage 54 and the power chamber 13 while the annular pin 50 forcibly moves the valve element 29 away from the first valve seat 28 against the resilience of the spring 30. As a consequence, the pressure oil which has been introduced into the pressure chamber 32 will pass through a clearance between the outer periphery of the annular pin 50 and the inner periphery of the stepped sleeve 21 into the power chamber 13, and such pressure oil introduced into the power chamber 13 is effective to drive the power piston 2 to the left at a given booster ratio to provide a braking action, generally in a similar manner as occurring in a conventional liquid pressure booster.

In the present embodiment, a conduit 65 has its one end connected to the conduit 44 which is disposed downstream of the accumulator 45, and the other end of the conduit 65 is connected to a radial passage 66 formed in the housing 1. The passage 66 opens into the bore 1a at a location adjacent to the plug 11 and is maintained in communication with the power chamber 13. Accordingly, in the present embodiment, a second supply passage 67 which allows the power chamber 13 to communicate directly with the pump 47 without passing through the valve mechanism 27 comprises the passage 66, the conduit 65 and the conduit 44.

An annular notch 2e is formed around the periphery of the larger diameter portion 2a of the power piston 2 adjacent to its free end in order to prevent the opening of the passage 66 from being closed by the peripheral portion of the power piston 2 when the power piston 2 assumes its inoperative positon shown.

Intermediate the length of the conduit 65 which forms the second supply passage 67, a first open/close valve 68 is disposed at an upstream position or near the pump 47 and a pressure regulating valve 69 is disposed downstream of the valve 68. The valve 68 is controlled by a controller 70, which is also effective to change the pressure set-up of the regulating valve 69. A second open/close valve 71 is disposed in the conduit 17 which forms the discharge passage 61, and is also controlled by the controller 70.

Connected to the controller 70 is a detector 72 such as a vehicle speed detector which is operative to detect a parking condition of a vehicle, an acceleration detector which serves detecting the depression of an accelerator pedal or an inclinometer which detects an inclined attitude of a vehicle for detecting a condition under which the first valve 68 and the second valve 71 are to be opened or closed.

In the described arrangement, the controller 70 normally closes the first valve 68 disposed in the second supply passage 67 and opens the second valve 71 disposed in the discharge passage 61. Under this condition, the resulting arrangement is similar to a conventional liquid pressure booster which is devoid of the second supply passage 67 and the second valve 71, and hence operates in the similar manner as in a conventional booster.

By contrast, when the controller 70 determines that a condition prevails under which the liquid pressure booster is to be operated automatically, by comparing a result of detection by the detector 72 against a pre-stored condition, it opens the first valve 68 in the second supply passage 67 and closes the second valve 71 in the discharge passage 61. Thereupon pressure fluid is introduced into the power chamber 13 through the second supply passage 67, whereby the power piston 2 is driven to the left to provide a braking action without the depression of a brake pedal.

At this time, the controller 70 is able to adjust the fluid pressure introduced into the power chamber 13, and hence the braking force, by changing the pressure set-up of the regulating valve 69. Accordingly, the pressure set-up may be modified in response to a signal from an inclinometer which detects an inclined attitude of a vehicle or alternatively the fluid pressure can be increased if the introduction of a standard fluid pressure is ineffective to prevent a movement of the vehicle.

Subsequently when the controller 70 determines that a condition prevails under which the automatic braking action is to be released on the basis of an input from the detector 72, it closes the first valve 68 and opens the second valve 71, thereby allowing the pressure fluid which has been introduced into the power chamber 13 to be discharged to the reservoir 18 through the discharge passage 61, thus terminating the braking action.

While the invention has been described above in connection with the preferred embodiment thereof, it should be understood that a number of changes, modifications and substitutions therein will readily occur to one skilled in the art from the above disclosure without departing from the spirit and scope of the invention defined by the appended claims.

What is claimed is:

1. A liquid pressure booster including a power piston slidably disposed in a housing, a power chamber defined within the housing on one side of the power piston, a stepped bore formed in the power piston and including a bore of a smaller diameter and a bore of a larger diameter, said larger diameter bore opening into the power chamber, a supply passage for communicating the smaller diameter bore with a source of pressure fluid, a first valve seat formed within the smaller diameter bore, a valve element slidably disposed within the smaller diameter bore and adapted to be seated upon the first valve seat from the side nearer the source of pressure fluid, an input shaft supported for movement within the stepped bore of the power piston, said input shaft being provided with an annular pin disposed for abutment against the valve element from the side nearer the larger diameter bore to move the valve element away from the first valve seat, thereby allowing pressure fluid from the source to be introduced into the power chamber, said annular pin having a discharge passage formed therein and extending axially therethrough to provide communication between the power chamber and a reservoir, a second valve seat formed on a free end of the annular pin to interrupt communication between the power chamber and the discharge passage upon abutment of the annular pin against the valve element, a stepped sleeve having portions of smaller and larger diameter which are respectively fitted into the smaller and larger diameter bores of the power piston, the first valve seat on which the valve element is adapted to be seated being formed on a free end of the smaller diameter portion of the stepped sleeve, and first seal means for maintaining a hermetic seal between the smaller diameter portion and the smaller diameter bore; and means for (1) securing the stepped sleeve to the power piston and (2) restricting withdrawal of the input shaft from the power piston, including a stopper ring and a further sleeve fitted successively in the larger diameter bore of the power piston to restrict the retreat of the input shaft with respect to the power piston, the stopper ring being interposed between the further sleeve and the stepped sleeve in contact with the larger diameter portion of the stepped sleeve, and securing means for securing the further sleeve to the power piston to thereby secure the stepped sleeve and the stopper ring to the power piston.

2. A liquid pressure booster according to claim 1, wherein said stepped sleeve has a one-piece monolithic construction, said one-piece monolithic stepped sleeve having a non-uniform outer diameter, said larger diameter portion having a larger outer diameter than said smaller diameter portion so that the radially outer surface of said larger diameter portion is radially outwardly offset from the radially outer surface of said smaller diameter portion, said stepped sleeve including an axially facing annular step portion defined radially between said radially offset outer surfaces of said smaller and larger diameter portions, and said annular step portion axially abutting a portion of said power piston which immediately surrounds said smaller diameter bore.

3. A liquid pressure booster according to claim 1, wherein an end of the valve element which is remote from a portion thereof which is adapted to be seated upon the first valve seat extends through second seal means into a balance chamber, a pressure chamber being defined between the second seal means and the first valve seat and communicating with the supply passage, the balance chamber communicating with the power chamber through a communication opening formed in the power piston, said supply passage being a through-opening extending obliquely from the outer peripheral surface of the power piston into the bore of a smaller diameter, the communication opening which provides communication between the balance chamber and the power chamber comprising a first communication opening formed as an extension of the through-opening and a second communication opening formed to extend axially of the power piston, the second seal means being disposed between the through-opening and the first communication opening to interrupt communication therebetween.

4. A liquid pressure booster including a power piston slidably disposed in a housing, a power chamber defined within the housing on one side of the power piston, a stepped bore formed in the power piston and including a bore of a smaller diameter and a bore of a larger diameter, the latter opening into the power chamber, a supply passage for communicating the bore of a smaller diameter to a source of pressure fluid, a first valve seat formed within the bore of a smaller diameter, a valve element slidably disposed within the bore of a smaller diameter and adapted to be seated upon the first valve seat from the side nearer the source of pressure fluid, an annular pin disposed for abutment against the valve element from the side nearer the bore of a larger diameter to move the valve element away from the first valve seat, thereby allowing a pressure fluid from the source to be introduced into the power chamber, a discharge passage formed to extend axially through the annular pin and providing a communication between the power chamber and a reservoir, and a second valve seat formed on the free end of the annular pin to interrupt a communication between the power chamber and the discharge passage upon abutment of the annular pin against the valve element, characterized by a stepped sleeve having portions of a smaller and a larger diameter which are fitted into the bores of a smaller and a larger diameter, respectively, formed in the power piston, a stopper ring and a sleeve fitted successively in the larger diameter bore of the power piston to restrict the retreat of an input shaft with respect to the power piston, the stopper ring and sleeve being successively brought into contact with the larger diameter portion of the stepped sleeve, securing means for coupledly securing the sleeve to the power piston to secure the stepped sleeve and the stopper ring to the power piston, the first valve seat on which the valve element is adapted to be seated being formed on the free end of the smaller diameter portion of the stepped sleeve, and first seal means for maintaining a liquid tightness between the smaller diameter portion and the bore of a smaller diameter.

5. A liquid pressure booster according to claim 4, wherein said stepped sleeve has a one-piece monolithic construction, said one-piece monolithic stepped sleeve having a non-uniform outer diameter, said larger diameter portion having a larger outer diameter than said smaller diameter portion so that the radially outer surface of said larger diameter portion is radially outwardly offset from the radially outer surface of said smaller diameter portion, said stepped sleeve including an axially facing annular step portion defined radially between said radially offset outer surfaces of said smaller and larger diameter portions, and said annular step portion axially abutting a portion of said power piston which immediately surrounds said smaller diameter bore.

6. A liquid pressure booster according to claim 4, wherein an end of the valve element which is remote from a portion thereof which is adapted to be seated upon the first valve seat extends through second seal means into a balance chamber, a pressure chamber being defined between the second seal means and the first valve seat and communicating with the supply passage, the balance chamber communicating with the power chamber through a communication opening formed in the power piston, said supply passage being a through-opening extending obliquely from the outer peripheral surface of the power piston into the bore of a smaller diameter, the communication opening which provides communication between the balance chamber and the power chamber comprising a first communication opening formed as an extension of the through-opening and a second communication opening formed to extend axially of the power piston, the second seal means being disposed between the through-opening and the first communication opening to interrupt communication therebetween.

* * * * *